US010282873B2

(12) United States Patent
Greenburg

(10) Patent No.: US 10,282,873 B2
(45) Date of Patent: May 7, 2019

(54) UNIFIED COORDINATE SYSTEM FOR MULTIPLE CT SCANS OF PATIENT LUNGS

(71) Applicant: COVIDIEN LP, Mansfield, MA (US)

(72) Inventor: Benjamin Greenburg, Hod Hasharon (IL)

(73) Assignee: COVIDIEN LP, Mansfield, MA (US)

( * ) Notice: Subject to any disclaimer, the term of this patent is extended or adjusted under 35 U.S.C. 154(b) by 0 days.

(21) Appl. No.: 16/054,190

(22) Filed: Aug. 3, 2018

(65) Prior Publication Data
US 2018/0342089 A1 Nov. 29, 2018

Related U.S. Application Data

(63) Continuation of application No. 15/665,514, filed on Aug. 1, 2017, now Pat. No. 10,049,471, which is a (Continued)

(51) Int. Cl.
G06T 7/38 (2017.01)
G06T 11/00 (2006.01)
(Continued)

(52) U.S. Cl.
CPC ............. G06T 11/008 (2013.01); G06T 7/38 (2017.01); G06T 15/00 (2013.01); G06T 19/20 (2013.01);
(Continued)

(58) Field of Classification Search
CPC . A61B 6/032; A61B 2090/364; A61B 6/5205; A61B 8/13; A61B 8/483;
(Continued)

(56) References Cited

U.S. PATENT DOCUMENTS 5,364,392 A 11/1994 Warner et al.
5,685,839 A 11/1997 Edwards et al.
(Continued)

FOREIGN PATENT DOCUMENTS

JP 2001518351 A 10/2001
JP 2005124895 A 5/2005
(Continued)

OTHER PUBLICATIONS

PCT International Search Report for PCT/US2015/038737 dated Oct. 14, 2015.
(Continued)

Primary Examiner — Haixia Du

(57) ABSTRACT

A CT alignment system includes a central processing unit (CPU) that processes a plurality of CT images. The CPU determines a location of a main carina from the plurality of CT images and sets the main carina as a point of origin. An x-coordinate, a y-coordinate, and a z-coordinate is calculated for each pixel in each CT image among the plurality of CT images based on the point of origin. A 3D model is rendered from the plurality of CT images and the x-coordinate, the y-coordinate, and the z-coordinate for each pixel in each CT image is associated with a corresponding voxel in the 3D model. The x-coordinate, the y-coordinate, and the z-coordinate for each corresponding voxel in the 3D model is stored as voxel position data. A graphics processing unit (GPU) renders a three dimensional (3D) model based on the plurality of CT images and the voxel position data which is displayed on a display.

12 Claims, 4 Drawing Sheets

Related U.S. Application Data continuation of application No. 14/788,952, filed on Jul. 1, 2015, now Pat. No. 9,727,986.

(60) Provisional application No. 62/020,242, filed on Jul. 2, 2014.

(51) Int. Cl.
  *G06T 15/00* (2011.01)
  *G06T 19/20* (2011.01)

(52) U.S. Cl.
  CPC ............... *G06T 2207/10081* (2013.01); *G06T 2207/30061* (2013.01); *G06T 2210/41* (2013.01)

(58) Field of Classification Search
  CPC ............ G01N 23/046; G01N 2223/419; G06T 2207/10081; G06T 2207/30004; G06T 11/003; G06T 2207/30061; G06T 7/30; Y10S 378/901
  See application file for complete search history.

(56) References Cited

U.S. PATENT DOCUMENTS

| | | | |
|---|---|---|---|
| 6,122,341 A * | 9/2000 | Butler | A61B 6/12 378/20 |
| 6,427,089 B1 | 7/2002 | Knowlton | |
| 6,575,969 B1 | 6/2003 | Rittman, III et al. | |
| 6,689,127 B1 | 2/2004 | Gough et al. | |
| 7,113,832 B2 | 9/2006 | Longo | |
| 7,123,008 B1 | 10/2006 | Damadian et al. | |
| 7,206,462 B1 | 4/2007 | Betke et al. | |
| 9,727,986 B2 | 8/2017 | Greenburg | |
| 10,049,471 B2 | 8/2018 | Greenburg | |
| 2002/0026187 A1 | 2/2002 | Swanson | |
| 2003/0185426 A1 | 10/2003 | Ohishi | |
| 2004/0049254 A1 | 3/2004 | Longo | |
| 2005/0080333 A1 | 4/2005 | Piron et al. | |
| 2005/0182295 A1* | 8/2005 | Soper | A61B 1/0008 600/117 |
| 2005/0245920 A1 | 11/2005 | Vitullo et al. | |
| 2006/0004351 A1 | 1/2006 | Mess et al. | |
| 2006/0149134 A1 | 7/2006 | Soper et al. | |
| 2006/0181551 A1* | 8/2006 | Matsumoto | G06T 15/08 345/679 |
| 2007/0127791 A1 | 6/2007 | Emvik et al. | |
| 2007/0177780 A1 | 8/2007 | Chui | |
| 2008/0033424 A1 | 2/2008 | van der Weide et al. | |
| 2011/0118723 A1 | 5/2011 | Turner et al. | |
| 2011/0237897 A1 | 9/2011 | Gilboa | |
| 2012/0114208 A1 | 5/2012 | Hirasawa et al. | |
| 2012/0259326 A1 | 10/2012 | Brannan et al. | |
| 2012/0288173 A1 | 11/2012 | Rai et al. | |
| 2013/0129174 A1 | 5/2013 | Grbic et al. | |
| 2014/0275952 A1 | 9/2014 | Monroe et al. | |

FOREIGN PATENT DOCUMENTS

| | | |
|---|---|---|
| JP | 2009112531 A | 5/2009 |
| JP | 2011516184 A | 5/2011 |
| JP | 2012187405 A | 10/2012 |
| WO | 2011063061 A2 | 5/2011 |
| WO | 2012071388 A2 | 5/2012 |
| WO | 2014025551 A1 | 2/2014 |

OTHER PUBLICATIONS

Baojun Li et al., "Establishing a Normative Atlas of the Human Lung: Intersubject Warping and Registration of Volumetric CT Images," Academic Radiology, vol. 10, No. 3, Mar. 1, 2003, pp. 255-265.

Extended European Search Report dated Dec. 22, 2017 and issued in corresponding European Patent Application No. 15815166.2.

Japanese Office Action dated Sep. 18, 2018 in corresponding Japanese Patent Application No. 2016-575497, together with English translation.

\* cited by examiner

US 10,282,873 B2

UNIFIED COORDINATE SYSTEM FOR MULTIPLE CT SCANS OF PATIENT LUNGS

CROSS-REFERENCE TO RELATED APPLICATIONS

This application is a continuation of U.S. patent application Ser. No. 15/665,514 filed on Aug. 1, 2017, which is a continuation of U.S. patent application Ser. No. 14/788,952 filed on Jul. 1, 2015, which claims the benefit of, and priority to, U.S. Provisional Patent Application No. 62/020,242, filed on Jul. 2, 2014, the entire contents of which are incorporated herein by reference.

BACKGROUND

1. Technical Field

The present disclosure relates to systems and methods for processing computed tomography (CT) images to align multiple sets of CT images in a unified coordinate system.

2. Discussion of Related Art

Visualization techniques related to visualizing a patient's lungs have been developed so as to help clinicians perform diagnoses and/or surgeries on the patient's lungs. Visualization is especially important for identifying a location of a diseased region. Further, when treating the diseased region, additional emphasis is given to identification of the particular location of the diseased region so that a surgical operation is performed at the correct location.

In the past, scanned two-dimensional (2-D) images of the lungs have been used to aid in visualization. In order to obtain the scanned 2-D images, a patient undergoes multiple CT scans. However, each CT scan has a different coordinate system based on scan parameters, start point(s), and field of view. When specifying a location in the lung, a user would specify a slice number along the Z-axis and then a pixel coordinate in two dimensions of the image starting from the top left corner of the image left to right on an X-axis and top to bottom on a Y-axis). The Digital Imaging and Communications in Medicine (DICOM) standard has coordinate conventions that define the patient orientation in the image which are included in the specific scan and/or machine.

SUMMARY

A system for aligning CT images in accordance with the present disclosure includes a central processing unit (CPU) that processes a plurality of CT image sets. The CPU processes each CT image set by determining a location of a main carina from a plurality of CT images in the CT image set, setting the main carina as a point of origin, calculating an x-coordinate, a y-coordinate, and a z-coordinate for each pixel in each CT image among the plurality of CT images based on the point of origin, rendering a 3D model from the plurality of CT images, associating the x-coordinate, y-coordinate, and z-coordinate for each pixel with a corresponding voxel in the 3D model, and storing x-coordinate, y-coordinate, and z-coordinate for each corresponding voxel in the 3D model as voxel position data. The system also includes a graphics processing unit (GPU) that processes the 3D model for each of the CT image sets in the plurality of CT image sets based on the voxel position data and a display that displays a first 3D model and a second 3D model.

In aspects, the CPU determines a first CT image among the plurality of CT images, wherein the first CT image includes the main carina, sets the z-coordinate for each pixel in the first CT image as zero, determines the x-coordinate for each pixel in the first CT image based on the point of origin, determines the y-coordinate for each pixel in the first CT image based on the point of origin, and stores the z-coordinate, the determined x-coordinate, and the determined y-coordinate for each pixel in the first CT image as first pixel position data.

In another aspect, the CPU processes a second CT image among the plurality of CT images, determines a z-coordinate for each pixel in the second CT image based on a distance between the first CT image and the second CT image, sets a reference point in the second CT image, wherein the reference point is axially aligned along a z-axis with the point of origin, determines the x-coordinate for each pixel in the second CT image based on the reference point; determines the y-coordinate for each pixel in the second CT image based on the reference point, and stores the determined z-coordinate, the determined x-coordinate, and the determined y-coordinate for each pixel in the second CT image as second pixel position data.

In some aspects, the plurality of CT images are obtained from a data store.

In other aspects, the display displays the first 3D model and the second 3D model side by side. Further, the first 3D model and the second 3D model are synchronized thereby permitting a user to manipulate the first 3D model and the second 3D model simultaneously.

The present disclosure also provides another system for aligning CT images that includes a CPU that processes a plurality of CT image sets. The CPU processes each CT image set by determining a location of a main carina, a right lobe carina, and a left lobe carina from a plurality of CT images in the CT image set, setting a reference plane based on the location of the main carina, the right lobe carina, and the left lobe carina, setting the main carina as a point of origin, calculating an x-coordinate, a y-coordinate, and a z-coordinate for each pixel in each CT image among the plurality of CT images based on the point of origin and the reference plane, and rendering a 3D model from the plurality of CT images, associating the x-coordinate, the y-coordinate, and the z-coordinate for each pixel in each CT image with a corresponding voxel in the 3D model, storing the x-coordinate, the y-coordinate, and the z-coordinate for each corresponding voxel in the 3D model as voxel position data. The system also includes a GPU that processes the 3D model for each of the CT image sets in the plurality of CT image sets based on the voxel position data and a display that displays a first 3D model and a second 3D model.

In some aspects, the CPU processes a CT image among the plurality of CT images, determines a z-coordinate for each pixel in the CT image based on a distance from the point of origin, sets a reference point in the CT image, wherein the reference point is coplanar with the reference plane and axially aligned along a z-axis with the point of origin, determines the x-coordinate for each pixel in the second CT image based on the reference point; determines the y-coordinate for each pixel in the second CT image based on the reference point, and stores the determined z-coordinate, the determined x-coordinate, and the determined y-coordinate for each pixel in the CT image the pixel position data.

In some aspects, the plurality of CT images are obtained from a data store.

In other aspects, the display displays the first 3D model and the second 3D model side by side. Further, the first 3D model and the second 3D model are synchronized thereby permitting a user to manipulate the first 3D model and the second 3D model simultaneously.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

Figure 1:
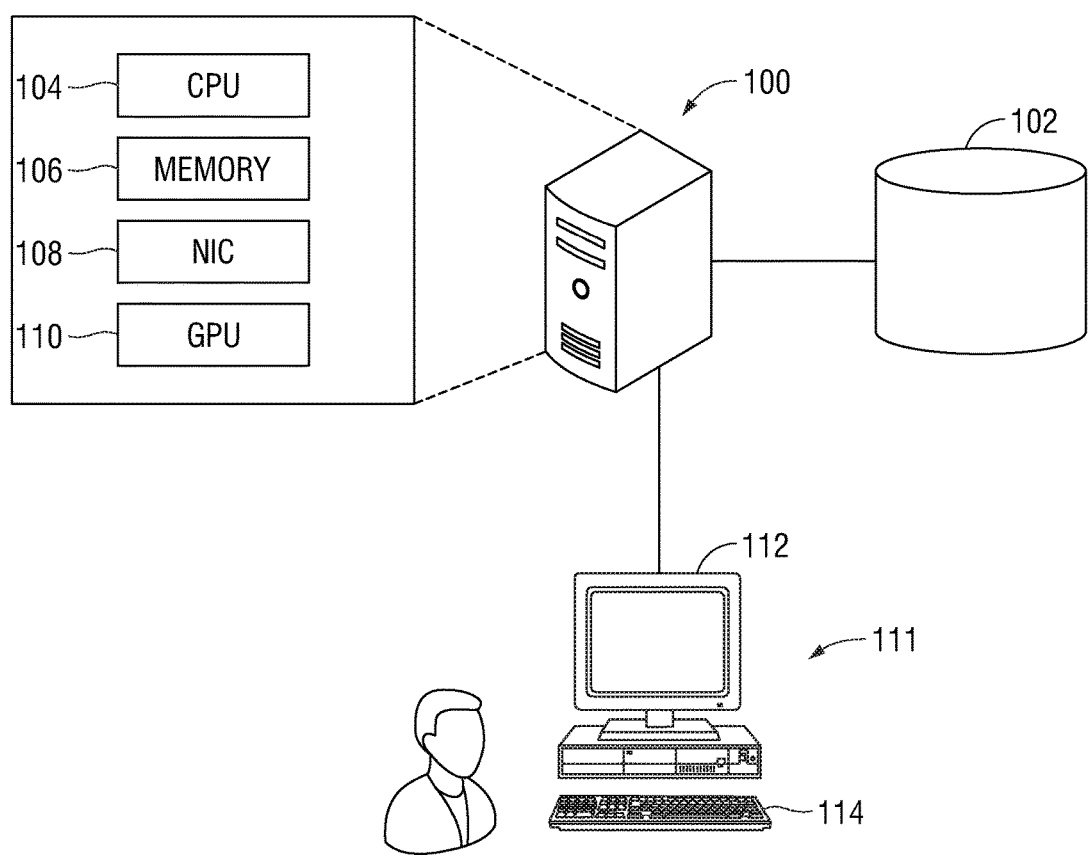
FIG. 1 is a schematic representation of a system for aligning multiple CT images in accordance with aspects of the present disclosure.

The present disclosure is related to devices, systems, and methods for aligning multiple sets of CT images in a unified coordinate system. Alignment of multiple sets of CT images may be a necessary component of pathway planning for performing an ELECTROMAGNETIC NAVIGATION BRONCHOSCOPY® (ENB) procedure using an electromagnetic navigation (EMN) system as well as monitoring the progression and/or regression of tumors or lesions.

An ENB procedure generally involves at least two phases: (1) planning a pathway to a target located within, or adjacent to, the patient's lungs; and (2) navigating a probe to the target along the planned pathway. These phases are generally referred to as (1) "planning" and (2) "navigation." The planning phase of an ENB procedure is more fully described in commonly-owned U.S. patent application Ser. Nos. 13/838,805; 13/838,997; and Ser. No. 13/839,224, all entitled "Pathway Planning System and Method," filed on Mar. 15, 2013, by Baker, the entire contents of which are hereby incorporated by reference. The patient's lungs are imaged by, for example, a computed tomography (CT) scan, although additional applicable methods of imaging will be known to those skilled in the art. The images may be taken prior to planning, prior to navigation, and/or after treatment. The image data assembled during the CT scans may then be stored in, for example, the Digital Imaging and Communications in Medicine (DICOM) format, although additional applicable formats will be known to those skilled in the art. The CT scan image data may then be loaded into a planning software application ("application") to be used during the planning phase of the ENB procedure.

Embodiments of the CT alignment systems and methods are described with reference to the accompanying drawings. Like reference numerals may refer to similar or identical elements throughout the description of the figures. As shown in the drawings and as used in this description, the "positive X direction" is from the patient left lateral to the right lateral, the "positive Y direction" is from the patient's anterior to the posterior, and the "positive Z direction" is from the patient's inferior to the superior.

This description may use the phrases "in an embodiment," "in embodiments," "in some embodiments," or "in other embodiments," which may each refer to one or more of the same or different embodiments in accordance with the present disclosure.

With reference to FIG. 1, a CT alignment system 100 is provided in accordance with an embodiment of the present disclosure. The CT alignment system 100 aligns the CT scan image data to a right hand orthogonal coordinate system that is tied to a major anatomical landmark within the patient's body thereby removing ambiguity when referring to locations between CT scans taken at different times and/or with different equipment. The CT alignment system 100 enables reviewing and comparing more than one CT scan of a patient with very easy manipulation of the data while enabling an easy method to communicate locations in the anatomy, e.g., the lung, that are not related to a specific machine or to detailed labeling of the anatomy.

As shown in FIG. 1, CT alignment system 100 receives CT scan image data from a data source 102. Data source 102 may be a server having CT scan image data obtained during pre-surgical testing stored thereon or data source 102 may be a device capable of obtaining CT images in real-time. System 100 also includes a central processing unit (CPU) 104, a memory 106, a network interface card (NIC) 108 and a graphics processing unit (GPU) 110. A workstation 111 includes a display 112 and input device 114 that allows a user to view the CT scan image data as well as manipulate the CT scan image data.

Figure 2:
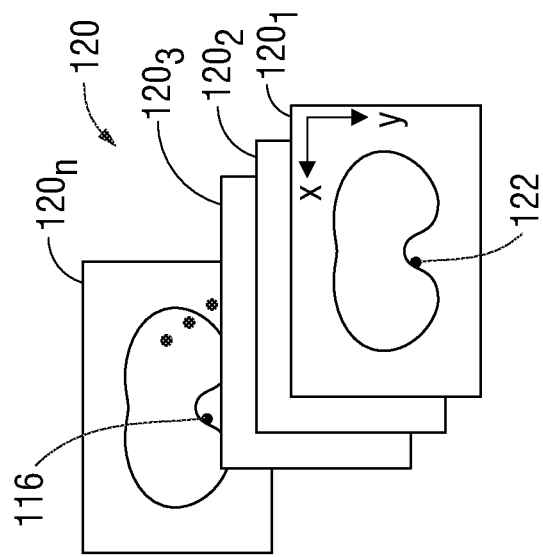
FIG. 2 is a perspective view of a patient illustrating a method used to align the CT images in accordance with aspects of the present disclosure.
Figure 2:
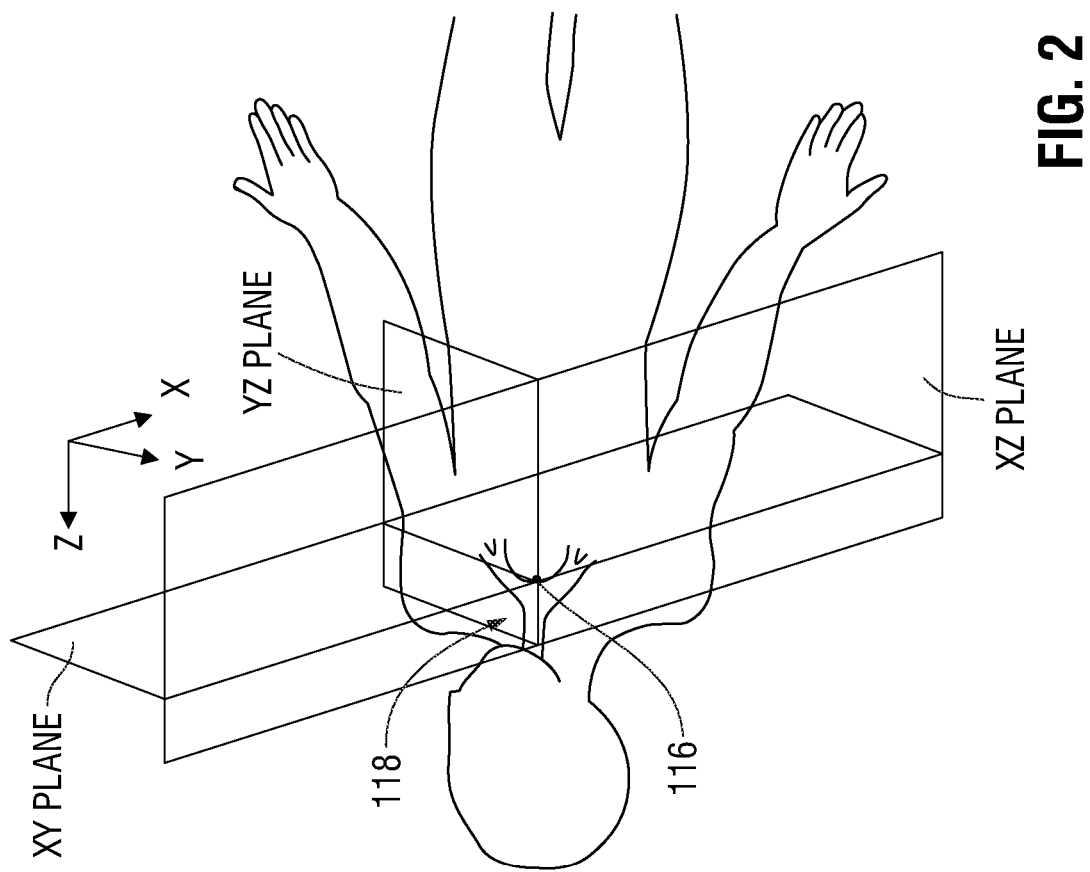

FIG. 2, which will be described while making reference to FIG. 1, depicts one method of aligning the CT scan image data using a reference point in the body of the patient using the system 100. As shown in FIG. 2 the point of origin 116 is located at the midst of the main carina 118. During a CT scanning procedure individual CT scan slices $120_1$, $120_2$ ... $120_n$ are taken along the Z-axis and stored in data source 102. The CT scan slices 120 are provided to the CPU 104 which uses an algorithm stored in memory 106 to determine the x, y, z coordinates of one or more pixels in one or more of the CT scan slices. Because the CT scan slices are parallel to the XY-plane, the z-coordinate for each CT scan slice is equal to the distance between the CT scan slice $120n$, which includes the point of origin 116, and the particular CT scan slice. Each pixel within the particular CT scan slice is then given an x-coordinate and a y-coordinate using a reference point 122 within the particular CT scan slice that is axially aligned with point of origin 116 along the z-axis.

The x, y, z coordinate for each voxel in the unified coordinate system may be determined as follows:
Given the following inputs:
n=CT scan slice number;
s=CT scan slice interval in mm (i.e., z distance between slices);
x=X coordinate in mm of a point on a specific CT slice;
y=Y coordinate in mm of a point on a specific CT slice;
$n_c$, $x_c$, $y_c$=coordinates for the point of origin 116; and
$n_p$, $x_p$, $y_p$=coordinates of a pixel in a CT scan,
the CPU 104 assigns coordinates ($X_{up}$, $Y_{up}$, $Z_{up}$), in mm, for each voxel in the unified coordinate system as follows:

$$X_{up} = x_p - x_c;$$

$$Y_{up} = y_p - y_c; \text{ and}$$

$$Z_{up} = n_p * s - n_c * s.$$

The CPU 104 renders the CT scan slices 120 as a 3D model, which is stored in memory 106. The coordinates for each pixel that was determined by CPU 104 for each of the CT scan slices $120_1, 120_2 \ldots 120_n$ are associated with each corresponding voxel in the 3D model. The coordinates are then stored with the 3D model in memory 106 as voxel position data.

When reviewed by a user, the GPU 110 processes the 3D model using the voxel position data to align the 3D model with another 3D model obtained from a different set of CT scan slices. More specifically, the two 3D models are processed and displayed on the display 112 associated with workstation 111, or in any other suitable fashion. Using workstation 111, various 3D models may be presented and/or may be manipulated by a clinician to facilitate identification of a target, selection of a suitable pathway through the patient's airways to access the target, etc.

Figure 3:
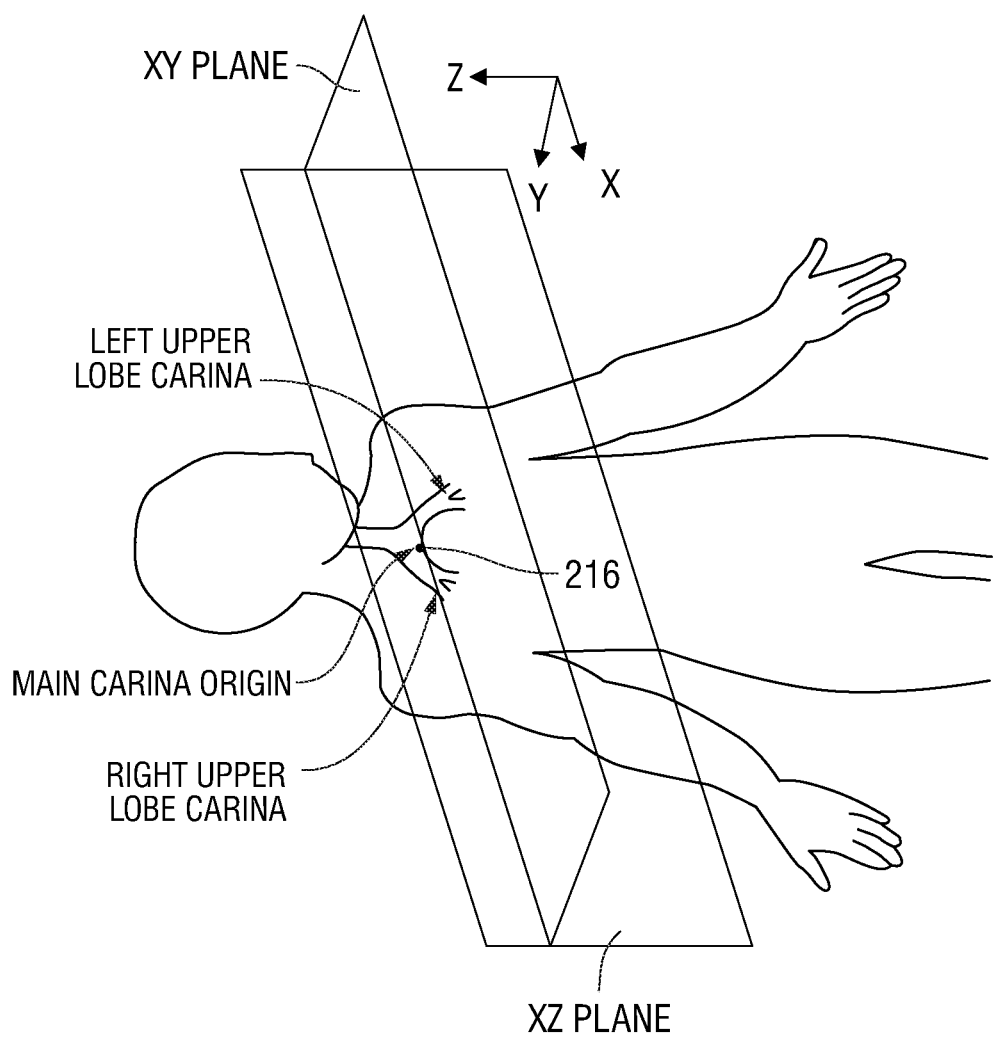
FIG. 3 is a perspective view of a patient illustrating another method used to align the CT images in accordance with another aspect of the present disclosure.

FIG. 3 depicts another method of aligning CT scan image data in accordance with another embodiment of the present disclosure. Similar to the method shown in FIG. 2, the point of origin 216 is located at the midst of the main carina. However, in FIG. 3, the XZ-plane is defined using three anatomical points: the main carina; the right upper lobe carina; and the left upper lobe carina. The CPU uses the defined XZ-plane as a reference plane when determining the x, y, z coordinates of each pixel in a particular CT scan slice. Specifically, the z-coordinate for each pixel is equal zd*cos α, where zd is the distance along a line perpendicular to the XY-plane between the CT scan slice that includes the point of origin 216 and the particular CT scan slice that includes the pixel and α is the angle at the point of origin 216 between the z-axis and the line perpendicular to the XY-plane. Each pixel within the particular CT scan slice is then given an x-coordinate and a y-coordinate using a reference point 122 within the particular CT scan slice that is: coplanar with the XZ-plane; and axially aligned with point of origin 216 along the z-axis. Similar to the method described above, the CPU 104 renders the CT scan slices as a 3D model and associates and stores the determined coordinates for each pixel in the CT scan slices for each voxel in the 3D model as voxel position data. The GPU 110 uses the 3D model using the voxel position data to align the 3D model with another 3D model obtained from a different set of CT scan slices.

Figure 4:
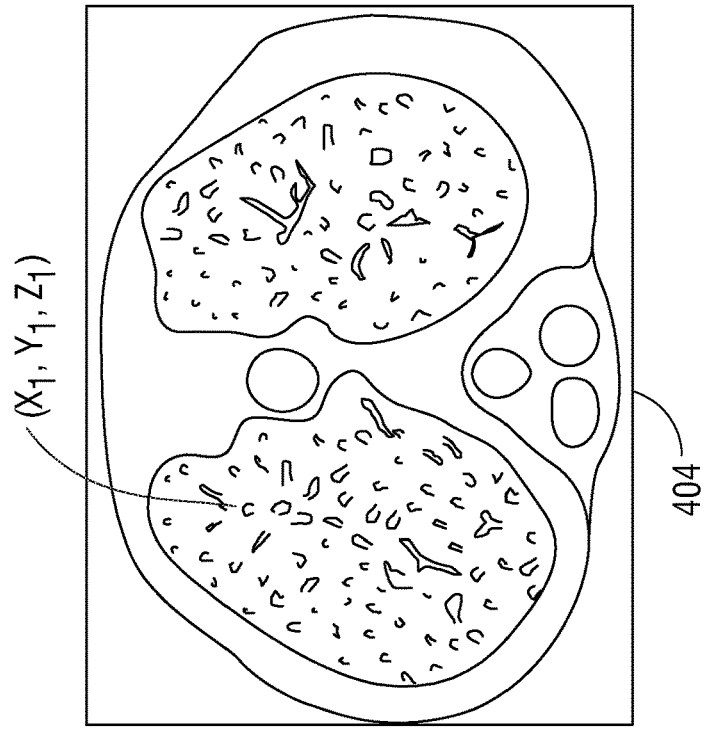
FIG. 4 is a side by side view of two CT scans that are aligned in accordance with the aspects of the present disclosure.
Figure 4:
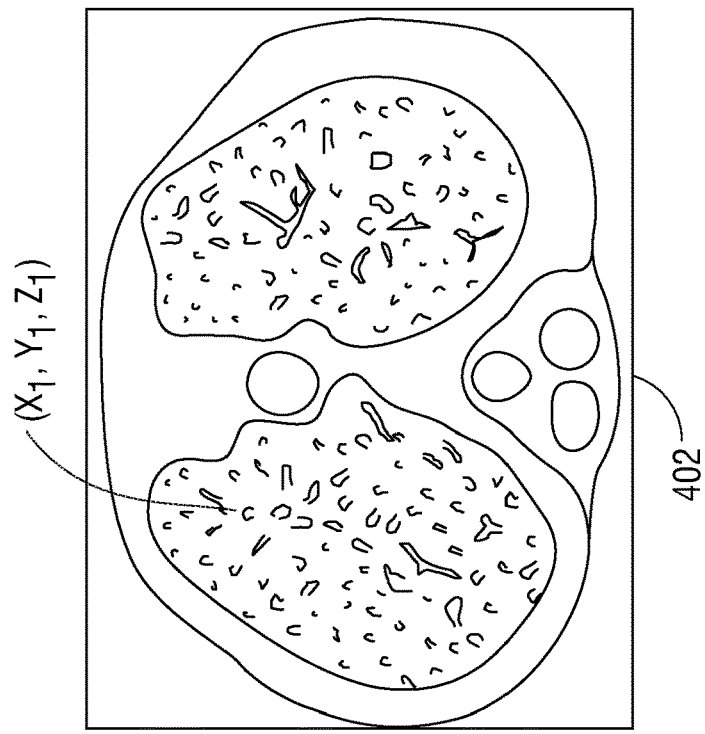

FIG. 4 depicts a side by side view of two (2) 3D models. 3D model 402 and 3D model 404 may be rendered from CT images taken at different times. Using the methods described above, each voxel in 3D model 402 and 3D model 404 would be assigned an x, y, z coordinate using the main carina as a point of origin. As such, the two (2) 3D models 402, 404 would be aligned in a unified coordinate system. Aligning the two (2) 3D models permits a user to track progression of a disease or results of a treatment (e.g., shrinkage of a tumor). For instance, if a tumor or lesion is found at location $x_1, y_1, z_1$ on 3D model 402, a user may easily find that location in 3D model 404 using the same coordinates. The images of these 3D models 402, 404 are preferably synchronized so that a user can scroll through them together, but may be un-synchronized. They may also be synchronized in the sense that changing views or adding views to one side of the screen results in the same on the other side. Measurement and analytics can also be done of 3D models 402, 404 and tumors, etc. Such measurements and analytics may be shown on 3D models 402, 404 and reports may be generated detailing the progress of the tumor.

The multiple sets of CT images may be used to render multiple three-dimensional (3D) models. Using the embodiments described above, the 3D models may be aligned in a unified coordinate system and displayed side by side. The 3D models are preferably synchronized so that a user can scroll through them together, but may be un-synchronized. They may also be synchronized in the sense that changing views or adding views to one side of the screen results in the same on the other side. Measurement and analytics can also be done of the 3D models and tumors, etc. Such measurements and analytics may be shown on the 3D models and reports may be generated detailing the progress of the tumor.

Returning to FIG. 1, CPU 104 receives various information and transforms the received information to generate an output. CPU 104 may include any type of computing device, computational circuit, or any type of processor or processing circuit capable of executing a series of instructions that are stored in a memory. The CPU 104 may include multiple processors and/or multicore central processing units and may include any type of processor, such as a microprocessor, digital signal processor, microcontroller, or the like. The CPU 104 may also include a memory to store data and/or algorithms to perform a series of instructions.

Any of the herein described methods, programs, algorithms or codes may be converted to, or expressed in, a programming language or computer program. A "Programming Language" and "Computer Program" is any language used to specify instructions to a computer, and includes (but is not limited to) these languages and their derivatives: Assembler, Basic, Batch files, BCPL, C, C+, C++, Delphi, Fortran, Java, JavaScript, Machine code, operating system command languages, Pascal, Perl, PL1, scripting languages, Visual Basic, metalanguages which themselves specify programs, and all first, second, third, fourth, and fifth generation computer languages. Also included are database and other data schemas, and any other metalanguages. For the purposes of this definition, no distinction is made between languages which are interpreted, compiled, or use both compiled and interpreted approaches. For the purposes of this definition, no distinction is made between compiled and source versions of a program. Thus, reference to a program, where the programming language could exist in more than one state (such as source, compiled, object, or linked) is a reference to any and all such states. The definition also encompasses the actual instructions and the intent of those instructions.

Any of the herein described methods, programs, algorithms or codes may be contained on one or more machine-readable media or memory 106. The term "memory" may include a mechanism that provides (e.g., stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

NIC 108 utilizes any known communication methods for transmitting and/or receiving data to or from one or more sources.

GPU 108 is a specialized electronic circuit designed to rapidly manipulate and alter memory to accelerate the creation of images in a frame buffer intended for output to a display.

Further aspects of image and data generation, management, and manipulation useable in either the planning or navigation phases of an ENB procedure are more fully described in commonly-owned U.S. Provisional Patent Application Ser. No. 62/020,220 entitled "Real-Time Automatic Registration Feedback," filed on Jul. 2, 2014, by Brown et al.; U.S. Provisional Patent Application Ser. No. 62/020,177 entitled "Methods for Marking Biopsy Location," filed on Jul. 2, 2014, by Brown; U.S. Provisional Patent Application Ser. No. 62/020,240 entitled "System and Method for Navigating Within the Lung," filed on Jul. 2, 2014, by Brown et al.; U.S. Provisional Patent Application Ser. No. 62/020,238 entitled "Intelligent Display," filed on Jul. 2, 2014, by Kehat et al.; U.S. Provisional Patent Application Ser. No. 62/020,245 entitled "Alignment CT," filed on Jul. 2, 2014, by Klein et al.; U.S. Provisional Patent Application Ser. No. 62/020,250 entitled "Algorithm for Fluoroscopic Pose Estimation," filed on Jul. 2, 2014, by Merlet; U.S. Provisional Patent Application Ser. No. 62/020,261 entitled "System and Method for Segmentation of Lung," filed on Jul. 2, 2014, by Markov et al.; U.S. Provisional Patent Application Ser. No. 62/020,253 entitled "Trachea Marking," filed on Jul. 2, 2014, by Lachmanovich et al.; U.S. Provisional Patent Application Ser. No. 62/020,257 entitled "Automatic Detection Of Human Lung Trachea," filed on Jul. 2, 2014, by Markov et al.; U.S. Provisional Patent Application Ser. No. 62/020,261 entitled "Lung And Pleura Segmentation," filed on Jul. 2, 2014, by Markov et al.; U.S. Provisional Patent Application Ser. No. 62/020,258 entitled "Cone View—A Method Of Providing Distance And Orientation Feedback While Navigating In 3d," filed on Jul. 2, 2014, by Lachmanovich et al.; and U.S. Provisional Patent Application Ser. No. 62/020,262 entitled "Dynamic 3D Lung Map View for Tool Navigation Inside the Lung," filed on Jul. 2, 2014, by Weingarten et al., the entire contents of all of which are hereby incorporated by reference. Any of the herein described systems and methods may transfer data therebetween over a wired network, wireless network, point to point communication protocol, a DICOM communication protocol, a transmission line, a removable storage medium, and the like.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A computed tomography (CT) alignment system comprising:
   a memory configured to store a plurality of CT images, wherein a distance between every two adjacent CT images is the same along a z-axis in an XYZ coordinate system;
   a processor configured to process a plurality of CT images stored in the memory by:
     setting a slice number for each of the plurality of CT images, wherein each pixel in each CT image has an x'-coordinate and a y'-coordinate in an X'Y' coordinate system;
     selecting a reference CT image, which includes a main carina, from the plurality of CT images;
     setting a location of the main carina in the reference CT image as an origin of the XYZ coordinate system;
     calculating an x-coordinate, a y-coordinate, and a z-coordinate of each pixel in each CT image in the plurality of CT images based on the origin and slice numbers in the XYZ coordinate system; and
     the generating a 3D model from the plurality of CT images by assigning an x-coordinate, a y-coordinate, and a z-coordinate of each voxel in the 3D model as voxel position data based on the x-, y-, and z-coordinates of a corresponding pixel, respectively; and
   a graphics processing unit (GPU) configured to render and display the 3D model on a display,
   wherein the x-coordinate of each pixel in each CT image in the XYZ coordinate system is calculated by subtracting an x'-coordinate of the origin from an x'-coordinate of each pixel in each CT image in the X'Y' coordinate system.

2. The CT alignment system according to claim 1, wherein each CT image has been captured parallel to an XY plane of the XYZ coordinate system.

3. The CT alignment system according to claim 1, wherein the y-coordinate of each pixel in each CT image in the XYZ coordinate system is calculated by subtracting a y'-coordinate of the origin from a y'-coordinate of each pixel in each CT image in the X'Y' coordinate system.

4. The CT alignment system according to claim 1, wherein the z-coordinate of each pixel in each CT image in the XYZ coordinate system is calculated:

$$N_p * S - N_c * S,$$

where Np is a slice number of each CT image, Nc is a slice number of the reference CT image, and S is the distance between every two adjacent CT images.

5. A computed tomography (CT) alignment method comprising:
   setting a slice number for each of a plurality of CT images stored in a memory, wherein a distance between every two adjacent CT images is same along a z-axis in an XYZ coordinate system, wherein each pixel in each CT image has an x'-coordinate and a y'-coordinate in an X'Y' coordinate system;
   selecting a reference CT image, which includes a main carina, from the plurality of CT images;
   setting a location of the main carina in the reference CT image as an origin of the XYZ coordinate system;
   calculating an x-coordinate, a y-coordinate, and a z-coordinate of each pixel in each CT image in the plurality of CT images based on the origin and slice numbers in the XYZ coordinate system;
   generating a 3D model from the plurality of CT images by assigning an x-coordinate, a y-coordinate, and a z-coordinate of each voxel in the 3D model as voxel position data based on the x-, y-, and z-coordinates of a corresponding pixel, respectively; and
   rendering and displaying the 3D model on a display,
   wherein the x-coordinate of each pixel in each CT image in the XYZ coordinate system is calculated by subtracting an x'-coordinate of the origin from an x'-coordinate of each pixel in each CT image in the X'Y' coordinate system.

6. The CT alignment method according to claim 5, wherein each CT image has been captured parallel to an XY plane of the XYZ coordinate system.

7. The CT alignment method according to claim 5, wherein the y-coordinate of each pixel in each CT image in the XYZ coordinate system is calculated by subtracting y' coordinate of the origin from a y'-coordinate of each pixel in each CT image in the X'Y' coordinate system.

8. The CT alignment method according to claim 5, wherein the z-coordinate of each pixel in each CT image in the XYZ coordinate system is calculated:

$$N_p * S - N_c * S,$$

where $N_p$ is a slice number of each CT image, $N_c$ is a slice number of the reference CT image, and S is the distance between every two adjacent CT images.

9. A non-transitory computer readable medium storing instructions to perform a computed tomography (CT) alignment method comprising:

setting a slice number for each of a plurality of CT images stored in a memory, wherein a distance between every two adjacent CT images is same along a z-axis in an XYZ coordinate system wherein each pixel in each CT image has an x'-coordinate and a y'-coordinate in an X'Y' coordinate system;

selecting a reference CT image, which includes a main carina, from the plurality of CT images;

setting a location of the main carina in the reference CT image as an origin of the XYZ coordinate system;

calculating an x-coordinate, a y-coordinate, and a z-coordinate of each pixel in each CT image in the plurality of CT images based on the origin and slice numbers in the XYZ coordinate system;

generating a 3D model from the plurality of CT images by assigning an x-coordinate, a y-coordinate, and a z-coordinate of each voxel in the 3D model as voxel position data based on the x-, y-, and z-coordinates of a corresponding pixel, respectively; and rendering and displaying the 3D model on a display, wherein the x-coordinate of each pixel in each CT image in the XYZ coordinate system is calculated by subtracting an x'-coordinate of the origin from an x'-coordinate of each pixel in each CT image in the X'Y' coordinate system.

10. The non-transitory computer readable medium according to claim 9, wherein each CT image has been captured parallel to an XY plane of the XYZ coordinate system.

11. The non-transitory computer readable medium according to claim 9, wherein the y-coordinate of each pixel in each CT image in the XYZ coordinate system is calculated by subtracting a y'-coordinate of the origin from a y'-coordinate of each pixel in each CT image in the X'Y' coordinate system.

12. The non-transitory computer readable medium according to claim 9, wherein the z-coordinate of each pixel in each CT image in the XYZ coordinate system is calculated:

$$N_p*S-N_c*S,$$

where $N_p$ is a slice number of each CT image, $N_c$ is a slice number of the reference CT image, and S is the distance between every two adjacent CT images.

* * * * *